(12) United States Patent
Kiuchi

(10) Patent No.: US 11,022,057 B2
(45) Date of Patent: Jun. 1, 2021

(54) ENGINE AND CONTROL METHOD THEREFOR

(71) Applicant: ISUZU MOTORS LIMITED, Tokyo (JP)

(72) Inventor: Takayuki Kiuchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/614,761

(22) PCT Filed: May 15, 2018

(86) PCT No.: PCT/JP2018/018769
§ 371 (c)(1),
(2) Date: Nov. 18, 2019

(87) PCT Pub. No.: WO2018/212182
PCT Pub. Date: Nov. 22, 2018

(65) Prior Publication Data
US 2020/0173386 A1    Jun. 4, 2020

(30) Foreign Application Priority Data

May 19, 2017   (JP) .............................. JP2017-099817

(51) Int. Cl.
*F02D 41/02*    (2006.01)
*F01N 3/021*    (2006.01)
(Continued)

(52) U.S. Cl.
CPC ........... *F02D 41/029* (2013.01); *F01N 3/021* (2013.01); *F01N 3/28* (2013.01); *F01N 3/36* (2013.01);
(Continued)

(58) Field of Classification Search
CPC combination set(s) only.
See application file for complete search history.

(56) References Cited

U.S. PATENT DOCUMENTS 8,549,843 B2 *   10/2013   Hagio ................ B01D 53/9495
                                                              60/295
9,624,856 B2 *    4/2017   Nagaoka .................. F02D 41/40
(Continued)

FOREIGN PATENT DOCUMENTS

CN    102844532 A    12/2012
CN    105283640 A     1/2016
(Continued)

OTHER PUBLICATIONS

International Search Report and Written Opinion for related International Application No. PCT/JP2018/018769, dated Aug. 7, 2018; English translation of ISR provided (7 pages).
(Continued)

*Primary Examiner* — Binh Q Tran
(74) *Attorney, Agent, or Firm* — Procopio, Cory, Hargreaves & Savitch LLP

(57) ABSTRACT

Based on an exhaust gas temperature on an upstream side acquired by an upstream temperature acquisition device, in performing control of supplying an unburned fuel to an oxidation catalyst device in a case where the exhaust gas temperature on the upstream side is lower than a low temperature, a control device performs control of adjusting at least one of an injection timing of a cylinder injection valve and opening-closing timing of an exhaust valve at least one of before and after the supplying control; raising a temperature of the exhaust gas that substantially free of unburned fuel discharged from the exhaust valve to be
(Continued)

higher than the low temperature; and warming the oxidation catalyst device until a predetermined warming period has passed.

7 Claims, 11 Drawing Sheets

(51) Int. Cl.
*F01N 3/28* (2006.01)
*F01N 3/36* (2006.01)
*F02D 13/02* (2006.01)
*F02D 41/40* (2006.01)
*F02D 41/38* (2006.01)

(52) U.S. Cl.
CPC ..... *F02D 13/0249* (2013.01); *F02D 41/0255* (2013.01); *F02D 41/401* (2013.01); *F02D 2041/389* (2013.01); *F02D 2200/0802* (2013.01)

(56) References Cited

U.S. PATENT DOCUMENTS

| | | |
|---|---|---|
| 2002/0129600 A1 | 9/2002 | Yamamoto et al. |
| 2009/0044517 A1* | 2/2009 | Oba .................. F01N 3/106 60/285 |
| 2009/0145115 A1 | 6/2009 | Torisaka |
| 2009/0183494 A1* | 7/2009 | Iwashita ............ F02D 41/402 60/286 |
| 2013/0025264 A1 | 1/2013 | Nagaoka et al. |
| 2016/0123207 A1 | 5/2016 | Aso et al. |
| 2016/0326978 A1* | 11/2016 | Solomon ............ F01N 3/2066 |

FOREIGN PATENT DOCUMENTS

| | | |
|---|---|---|
| JP | 2000-054837 A | 2/2000 |
| JP | 2004-257267 A | 9/2004 |
| JP | 2010-169052 A | 8/2010 |
| WO | 2007-026809 A1 | 3/2007 |

OTHER PUBLICATIONS

First Office Action for related CN App No. 201880033082.6 dated Mar. 3, 2021, 16 pgs.

* cited by examiner

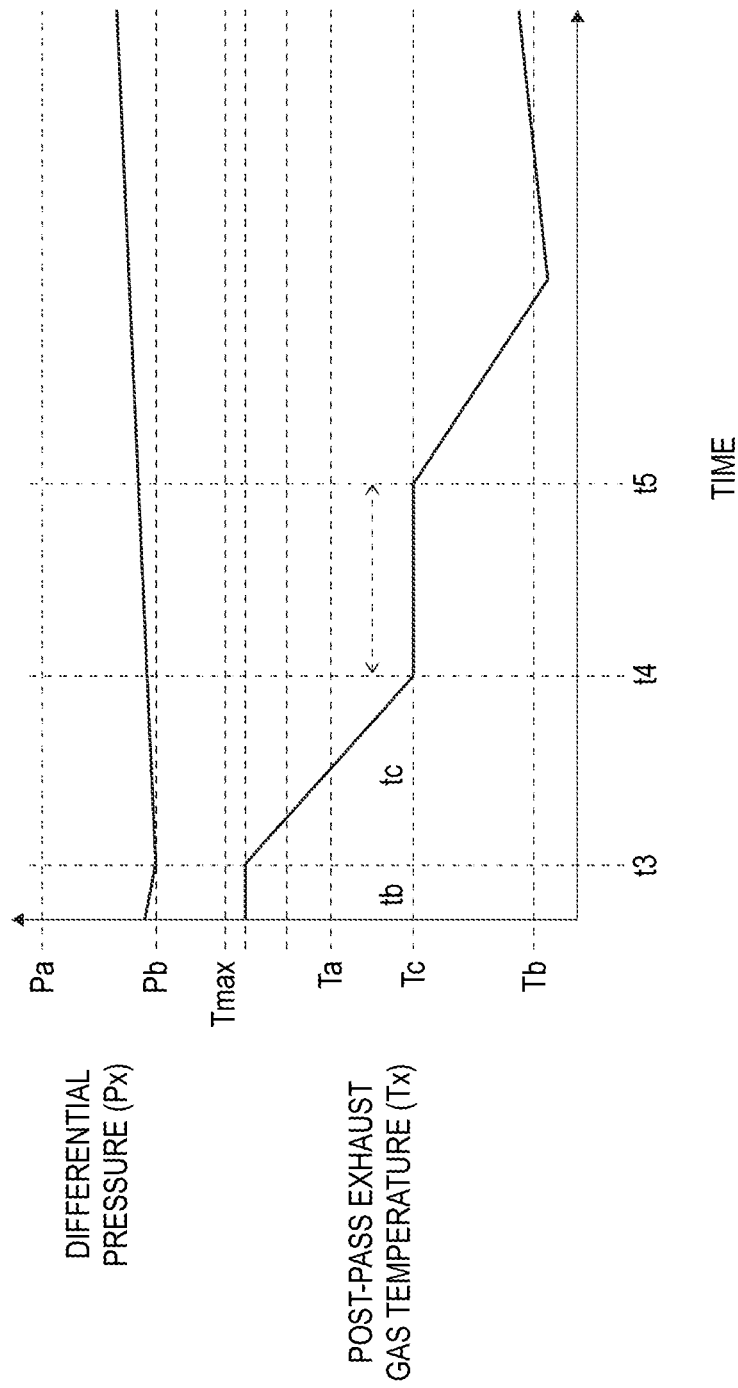

ENGINE AND CONTROL METHOD THEREFOR

CROSS-REFERENCE TO RELATED APPLICATIONS

This application is a U.S. National Stage entry of PCT Application No: PCT/JP2018/018769 filed on May 15, 2018, which claims priority to Japanese Patent Application No. 2017-099817, filed May 19, 2017, the contents of which are incorporated herein by reference.

TECHNICAL FIELD

This disclosure relates to an engine and a control method therefor.

BACKGROUND ART

As an exhaust purification system provided in an exhaust passage of an engine, there has been an exhaust gas purification system that includes a collection filter and an oxidation catalyst device on an upstream side thereof and that collects particulate matter discharged from the engine and then remove the particulate matter via regeneration control (see, for example, Patent Literature 1).

CITATION LIST

Patent Literature

Patent Literature 1: JP-A-2010-169052

SUMMARY OF INVENTION

Technical Problem

Incidentally, in some cases, an inlet side end face of the oxidation catalyst device is clogged, and clogging of the inlet side end face of the oxidation catalyst device affects the regeneration control of the collection filter. Clogging of the inlet side end face of the oxidation catalyst device occurs during low-speed low-load operation in which an exhaust gas temperature is low. During the low-speed low-load operation, a soluble organic fraction (SOF) contained in the exhaust gas adheres to the inlet side end surface of the oxidation catalyst device, the attached soluble organic fraction becomes a binder, and soot is deposited. In a case where the exhaust gas temperature during the low-speed low-load operation is low, the soluble organic fraction and the soot adhering to the inlet side end face tend to be highly viscous and easily deposited. The deposition of the soluble organic fractions and the soot causes clogging of the inlet side end face of the oxidation catalyst device.

This disclosure provides an engine and a method for controlling the same that are capable of preventing adherence of a soluble organic fraction and a soot to an inlet side end surface of an oxidation catalyst device and thereby reducing clogging of the inlet side end surface.

Solution to Problem

According to this disclosure to achieve the above object, an engine includes: a cylinder; a cylinder injection valve that injects a fuel into the cylinder, an exhaust valve that discharges an exhaust gas generated due to combustion of the injected fuel from the cylinder; an exhaust passage through which the discharged exhaust gas passes; and an exhaust gas purification system disposed in the exhaust passage, wherein the exhaust gas purification system includes, in order from an upstream side toward a downstream side with respect to a flow of the exhaust gas in the exhaust passage, an oxidation catalyst device that oxidizes a fuel and a nitrogen oxide contained in the exhaust gas and a collection filter that collects a particulate matter contained in the exhaust gas, the engine comprising: an upstream temperature acquisition device that acquires an exhaust gas temperature on the upstream side of the oxidation catalyst device, and a control device, and wherein, based on the exhaust gas temperature on the upstream side acquired by the upstream temperature acquisition device, in performing control of supplying an unburned fuel to the oxidation catalyst device in a case where the exhaust gas temperature on the upstream side is lower than a predetermined low temperature, the control device performs control of: adjusting at least one of an injection timing of the cylinder injection valve and an opening-closing timing of the exhaust valve in at least one of before and after the supplying control; raising a temperature of the exhaust gas that substantially free of unburned fuel discharged from the exhaust valve to be higher than the low temperature; and warming the oxidation catalyst device until a predetermined warming period has passed.

According to this disclosure to achieve the above object, a method for controlling an engine to regenerate a collection filter by: adjusting at least one of an injection timing of a cylinder injection valve that injects a fuel into a cylinder and opening-closing timing of an exhaust valve that discharges an exhaust gas generated due to combustion of an injected fuel from the cylinder or adjusting an injection timing of a pipe injection valve disposed in an exhaust passage through which a discharged exhaust gas passes and injects a fuel; supplying unburned fuel to an oxidation catalyst device disposed in the exhaust passage; raising an exhaust gas temperature due to oxidation of the provided unburned fuel, and thereby removing a collected matter collected by a collection filter disposed on a downstream side of the oxidation catalyst device, includes: acquiring an exhaust gas temperature on the upstream side of the oxidation catalyst device; determining whether the exhaust gas temperature on the upstream side acquired by the upstream temperature acquisition device is equal to or lower than a predetermined low temperature; wherein in supplying the unburned fuel to the oxidation catalyst device to regenerate the collection filter in a case where it is determined that the exhaust gas temperature on the upstream side is equal to or lower than the low temperature, the method comprising: discharging an exhaust gas at a temperature higher than the low temperature in a manner substantially free of the unburned fuel by adjusting the at least one of the injection timing of the cylinder injection valve and the opening-closing timing of the exhaust valve at least one of before and after regenerating the collection filter; and warming the oxidation catalyst device with the discharged exhaust gas until a warming period has passed.

Advantageous Effects of Invention

According to this disclosure, in a status where the exhaust gas temperature on the upstream side of the oxidation catalyst device is low and the inlet side end surface of the oxidation catalyst device is clogged, heating is performed until the warming period has passed in at least one of before and after supplying the unburned fuel to the oxidation catalyst device.

By warming before supplying the unburned fuel to the oxidation catalyst device, it is possible to dry or combustion-remove the soluble organic fraction or soot adhering to the inlet side end face of the oxidation catalyst device. Further, by warming after supplying the unburned fuel to the oxidation catalyst device, it is possible to reduce a residual amount of the unburned fuel that is supplied to the oxidation catalyst device and that is in a non-oxidized state.

In this way, this disclosure is advantageous for preventing adherence of a soluble organic fraction and a soot to an inlet side end surface of an oxidation catalyst device, and is capable of reducing clogging of the inlet side end surface of the oxidation catalyst device.

BRIEF DESCRIPTION OF DRAWINGS

FIG. 11 is a chronological diagram illustrating a differential pressure before and after the collection filter and a change in an exhaust gas temperature after passing through an oxidation catalyst device of the engine of FIG. 8.

DESCRIPTION OF EMBODIMENTS

Figure 1:
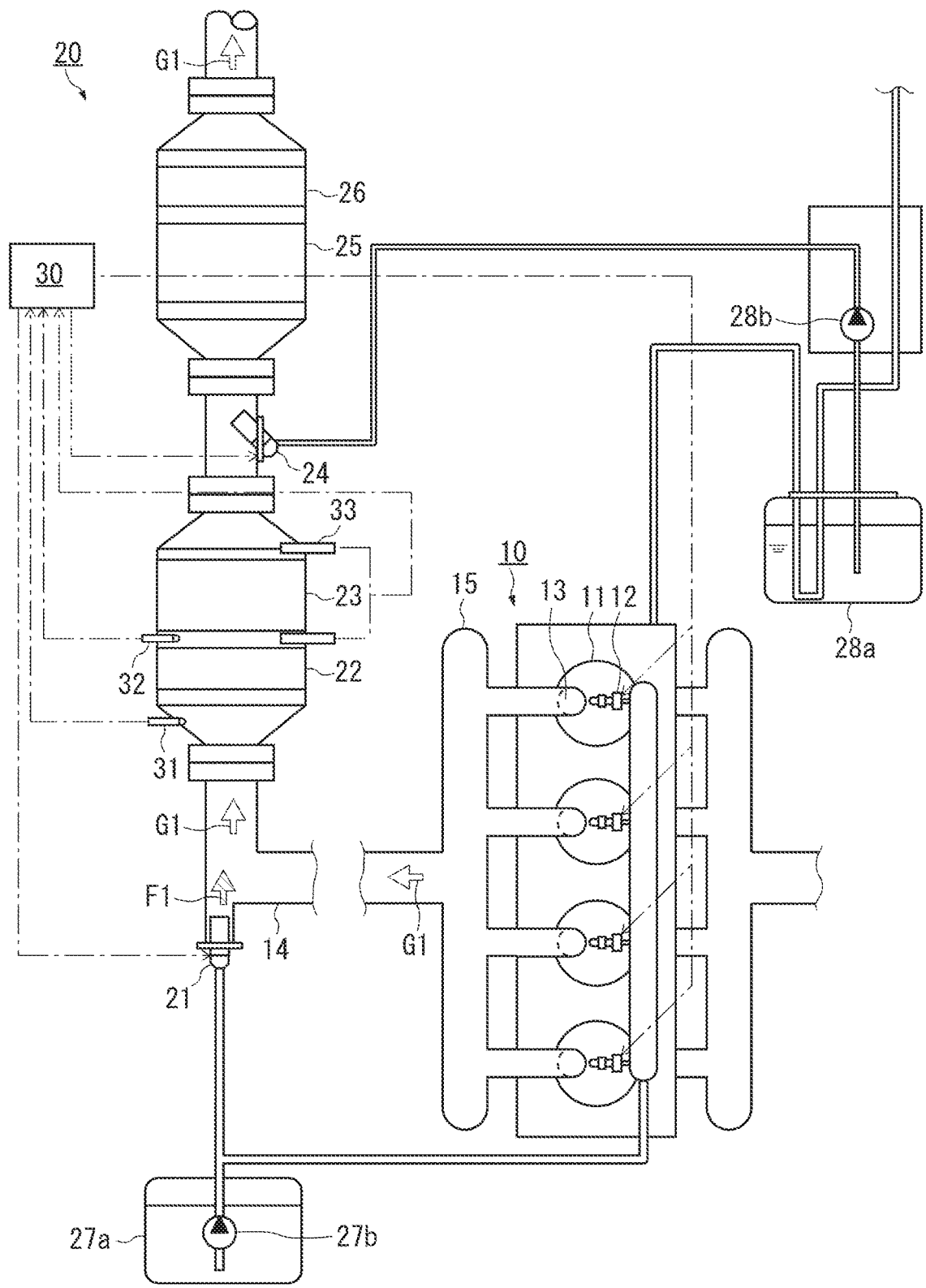
FIG. 1 is a block diagram illustrating a first embodiment of an engine according to this disclosure.

Hereinafter, an embodiment of an engine and a method for controlling the same according to this disclosure will be described. In the drawing, arrows indicated by G1 indicate a flow of an exhaust gas, and arrows indicated by F1 indicate a flow of an unburned fuel.

As illustrated in FIG. 1, an engine 10 of a first embodiment is mounted on a vehicle. The engine 10 includes cylinders 11, cylinder injection valves 12, exhaust valves 13, an exhaust passage 14, and an exhaust gas purification system 20. The engine 10 includes a control device 30 and various acquisition devices 31 to 33.

The plurality of cylinders 11 are arranged in series in an engine main body, and pistons (not shown) that reciprocate in a cylinder axis direction of the cylinder 11 are housed therein. The plurality of cylinder injection valves 12 are respectively disposed in the cylinders 11 and inject the fuel into the cylinders 11. The exhaust valves 13 are respectively disposed in the cylinders 11 and open in an exhaust stroke so as to discharge from the cylinders 11 an exhaust gas G1 generated due to combustion of the fuel injected into the cylinders 11 from the cylinder injection valves 12. The exhaust passage 14 is connected to an exhaust manifold 15, and allows the discharged exhaust gas G1 to pass therethrough.

The exhaust gas purification system 20 is a system that is disposed in the exhaust passage 14 and purifies the exhaust gas G1. The exhaust gas purification system 20 includes a pipe injection valve 21, an oxidation catalyst device 22, a collection filter 23, a reducing agent injection valve 24, a selective reduction catalyst device 25, and an ammonia catalyst device 26, which are arranged in order from an upstream side to a downstream side with respect to the flow of the exhaust gas G1 in the exhaust passage 14.

In the pipe injection valve 21, an injection port is inserted in the flow direction of the exhaust gas G1 at an intermediate position of the exhaust passage 14 interposed between the exhaust manifold 15 and the oxidation catalyst device 22. The pipe injection valve 21 is supplied with the same fuel as the fuel injected from the cylinder injection valve 12 to the cylinder 11 from a fuel supply system including a fuel tank 27a and a fuel pump 27b, and functions as a device for injecting and supplying an unburned fuel F1 toward the exhaust gas G1.

The oxidation catalyst device 22 is a porous structure having a cylindrical shape, and is formed with a plurality of ventilation holes (cells) that are partitioned by porous partition walls made of ceramics and respectively penetrate from inlets that allow inflow and outlets that allow outflow of the exhaust gas G1 and serving as a flow path of the exhaust gas G1. The oxidation catalyst device 22 carries an oxidation catalyst that oxidizes hydrocarbons, carbon monoxide, and nitric oxide that are contained in the exhaust gas G1 in the porous partition walls thereof. Examples of the oxidation catalyst include noble metals such as platinum (Pt), rhodium (Rh), and palladium (Pd).

The collection filter 23 is a porous structure having a cylindrical shape and is partitioned by porous partition walls made of ceramics, and is formed with a plurality of ventilation holes (cells) due to porous partition walls made of ceramics similar as the oxidation catalyst device 22. In the collection filter 23, unlike the oxidation catalyst device 22, each of the ventilation holes has either one of the inlet and the outlet closed by a plugging member, and adjacent ventilation holes are alternately closed at an inlet and an outlet of the collection filter 23.

In the reducing agent injection valve 24, an injection port is inserted in the flow direction of the exhaust gas G1 at an intermediate position of the exhaust passage 14 interposed between the collection filter 23 and the selective reduction catalyst device 25. The reducing agent injection valve 24 is supplied with urea water from a urea water supply system including a urea water tank 28a and a urea water pump 28b, and urea water is added as a reducing agent to the exhaust gas G1. The urea water supply system is provided with a cooling water pipe 29 through which cooling water flows after cooling the engine 10, and the urea water tank 28a, a pipe through which the urea water flows and the like are heated by the cooling water.

The selective reduction catalyst device 25 is a porous structure having a cylindrical shape and is partitioned by porous partition walls made of ceramics, and is formed with a plurality of ventilation holes (cells) due to porous partition walls made of ceramics similar as the oxidation catalyst device 22. Unlike the oxidation catalyst device 22, the selective reduction catalyst device 25 carries a selective reduction catalyst that reduces nitrogen oxides contained in the exhaust gas G1 in the porous partition walls thereof. Examples of the selective reduction catalyst include vanadium and zeolite.

The ammonia catalyst device 26 is a device for removing ammonia contained in the exhaust gas G1 after passing through the selective reduction catalyst device 25, and has a function of oxidatively decomposing ammonia or a function of adsorbing ammonia.

The control device 30 is hardware formed by a CPU that performs various types of information processing, an internal storage device capable of reading and writing programs for information processing as well as information processing results, various interfaces, and the like. The control device 30 is electrically connected to the cylinder injection valve 12, the pipe injection valve 21, the reducing agent injection valve 24, and the various acquisition devices 31 to 33 via signal lines indicated by one-dot chain lines.

An upstream temperature acquisition device 31 is disposed on the upstream side of the oxidation catalyst device 22 of the exhaust passage 14 with respect to the flow of the exhaust gas G1, and is configured with a temperature sensor that acquires an exhaust gas temperature Tx on the upstream side. The upstream temperature acquisition device 31 is preferably disposed at an inlet of the oxidation catalyst device 22. As the upstream temperature acquisition device 31, a device for modeling and predicting the exhaust gas temperature Tx on the upstream side based on a rotation speed of the engine 10 and an amount of fuel injected from the cylinder injection valve 12 and burned in the cylinder 11 may be used instead of the temperature sensor.

A post-pass temperature acquisition device 32 is disposed on the downstream side of the oxidation catalyst device 22 of the exhaust passage 14 with respect to the flow of the exhaust gas G1, and is configured with a temperature sensor that acquires an exhaust gas temperature Ty that is after passing through the oxidation catalyst device 22 and that is on the upstream side of the collection filter 23. The post-pass temperature acquisition device 32 is preferably disposed at an outlet of the oxidation catalyst device 22. As the post-pass temperature acquisition device 32, a device for modeling and predicting the post-pass exhaust gas temperature Ty based on the exhaust gas temperature Tx on the upstream side, an oxidation reaction in the oxidation catalyst device 22, and the like may be used instead of the temperature sensor.

A collection-status acquisition device 33 is a device for acquiring a collection status of a particulate matter in the collection filter 23, and is configured with a differential pressure sensor disposed on front and rear sides of the collection filter 23 to acquire a differential pressure Px before and after the collection filter 23. The collection-status acquisition device 33 may be any one as long as it can determine a numerical value with which it is possible to determine whether regeneration of the collection filter 23 is necessary (for example, a deposition amount of the particulate matter). As the collection-status acquisition device 33, for example, a PM sensor that measures the particulate matter contained in the exhaust gas G1 may be used instead of the differential pressure sensor. As the collection-status acquisition device 33, a device for modeling and predicting the deposition amount of the particulate matter from the rotation speed of the engine 10, a fuel injection amount, and the like may be used.

In the engine 10 described above, a purification target component contained in the exhaust gas G1 generated by burning the fuel injected from the cylinder injection valve 12 inside the cylinder 11 is purified by passing through the devices of the exhaust gas purification system 20. Specifically, the hydrocarbons, the carbon oxides, and the nitrogen oxides contained in the exhaust gas G1 are oxidized by the oxidation catalyst device 22. Next, the particulate matter (soluble organic fraction (SOF) and soot) contained in the exhaust gas G1 are collected by the collection filter 23. Next, the selective reduction catalyst device 25 reduces the nitrogen oxides contained in the exhaust gas G1 via a reduction reaction performed with ammonia generated by hydrolysis of the urea water injected from the reducing agent injection valve 24. Then, the ammonia contained in the exhaust gas G1 is removed by the ammonia catalyst device 26.

In the engine 10, the exhaust gas temperature Tx after passing through the oxidation catalyst device 22 is raised to a temperature Ta at which it is possible to forcibly regenerate the collection filter 23 (hereinafter, referred to as a forced regeneration temperature Ta), so as to combustion-remove the particulate matter collected by the collection filter 23 due to oxidation. Examples of the forced regeneration temperature Ta includes a high temperature of 500° C. or higher. In this embodiment, in a case where the post-pass exhaust gas temperature Tx is lower than the forced regeneration temperature Ta, the unburned fuel F1 is injected from the pipe injection valve 21 to oxidize the unburned fuel F1 with the oxidation catalyst device 22, and the temperature of the exhaust gas G1 is raised by utilizing an oxidation reaction heat generated by the oxidation.

Forced regeneration of the collection filter 23 may occur naturally depending on an operating state of the engine 10. For example, when the post-pass exhaust gas temperature Tx reaches the forced regeneration temperature Ta in a case where the engine 10 has a high rotation and a high load, regeneration of the collection filter 23 occurs naturally.

Figure 2:
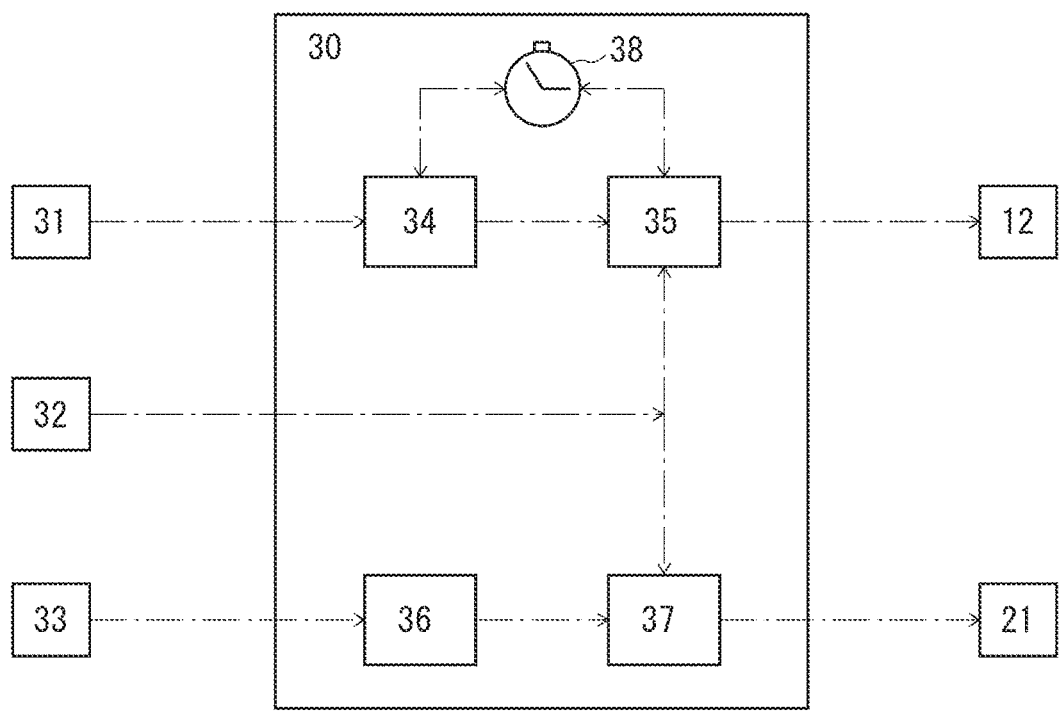
FIG. 2 is a configuration diagram illustrating a control device of FIG. 1.

As illustrated in FIG. 2, the control device 30 includes, as functional elements, a warming determination unit 34, a warming adjustment unit 35, a supply determination unit 36, a supply adjustment unit 37, and a timer 38. The functional elements are stored in the internal storage device as programs, and are executed by the CPU in a timely manner. The functional elements may also be devices that function independently instead of programs.

The warming determination unit 34 is a functional element that determines whether to perform control of warming the oxidation catalyst device 22 before forcibly regenerating the collection filter 23. The warming adjustment unit 35 is a functional element that adjusts an injection timing and an injection amount of the fuel injected from the cylinder injection valve 12 in the warming control. The supply determination unit 36 is a functional element that determines whether to perform control of supplying the unburned fuel F1 injected from the pipe injection valve 21 to the oxidation catalyst device 22 in order to forcibly regenerate the collection filter 23. The supply adjustment unit 37 is a functional element that adjusts an injection amount of the unburned fuel F1 injected from the pip injection valve 21 in the supplying control. The timer 38 is a functional element that counts passage of time.

Figure 3:
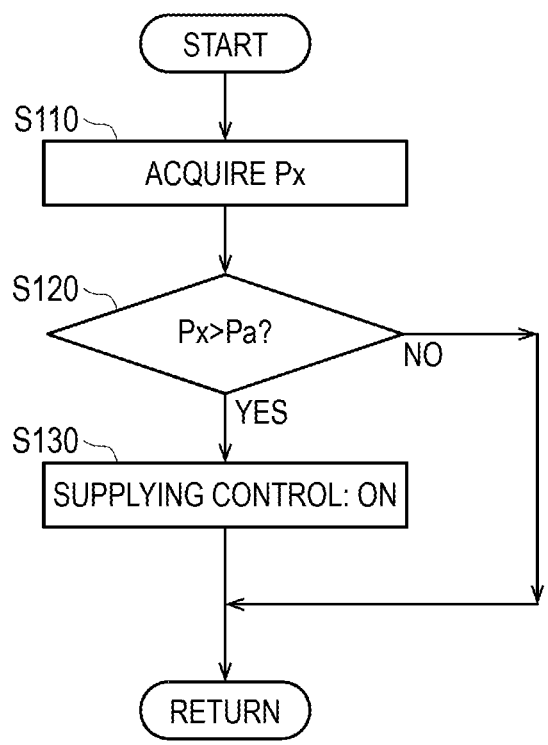
FIG. 3 is a first flowchart illustrating a first embodiment of a method for controlling an engine according to this disclosure.

As illustrated in FIG. 3, the control method of the engine 10 determines whether to perform periodic supplying control.

The collection-status acquisition device 33 acquires the differential pressure Px before and after the collection filter 23 (S110). Next, based on the differential pressure Px, the supply determination unit 36 determines whether the differential pressure Px exceeds a predetermined regeneration start differential pressure Pa (S120).

The regeneration start differential pressure Pa is set to a value with which it is possible to determine whether regeneration of the collection filter 23 is necessary. Specifically, the regeneration start differential pressure Pa is set to a value with which it is possible to determine that a fuel efficiency is deteriorated due to a pressure loss in the collection filter 23, which is increased due to accumulation of the particulate matter in the collection filter 23.

In a case where it is determined that the differential pressure Px is equal to or lower than the regeneration start differential pressure Pa in the above-described step (S120: NO), since it is not necessary to forcibly regenerate the collection filter 23, the process returns to the start. On the other hand, in a case where it is determined that the differential pressure Px exceeds the regeneration start differential pressure Pa (S120: YES), since it is necessary to forcibly regenerate the collection filter 23, the supply determination unit 36 determines to perform supplying control (sets a flag) (S130), and the process returns to the start.

Figure 4:
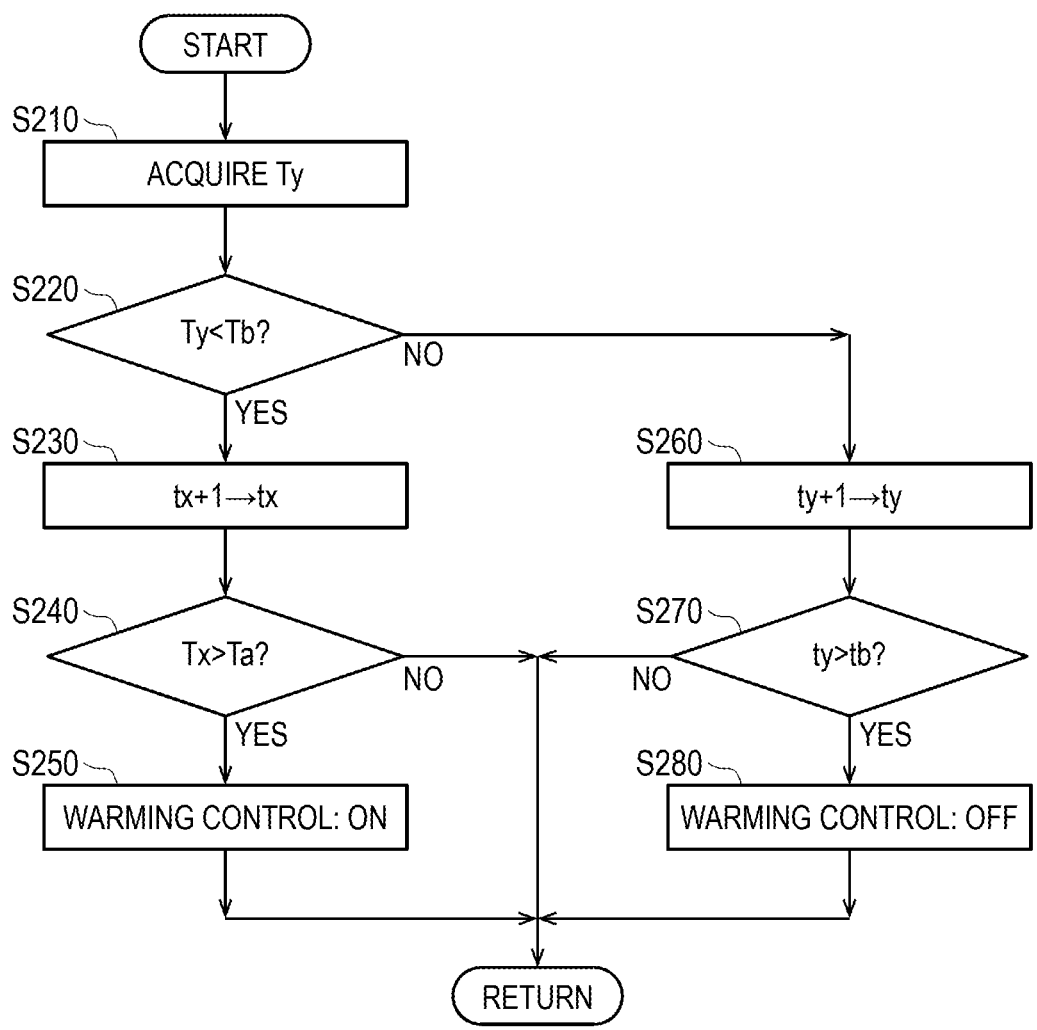
FIG. 4 is a second flowchart illustrating the first embodiment of the method for controlling an engine according to this disclosure.

As illustrated in FIG. 4, the method for controlling the engine 10 determines whether to periodically perform heating control in parallel with the flow of FIG. 3.

Th upstream temperature acquisition device 31 acquires the exhaust gas temperature Ty on the upstream side of the oxidation catalyst device 22 (S210). Next, the warming determination unit 34 determines whether the exhaust gas temperature Ty on the upstream side is lower than a predetermined low temperature Tb (S220).

The low temperature Tb is set to a value at which it is possible to determine a state in which the particulate matter adhering to the inlet side end face of the oxidation catalyst device 22 is difficult to burn or a state in which the unburned fuel F1 injected from the pipe injection valve 21 is difficult to vaporize. In other words, the low temperature Tb is set to the temperature of the exhaust gas G1 upon low-speed low-load operation of the engine 10. Examples of the low temperature Tb include a temperature of 180° C. or lower (including 180° C.).

In a case where it is determined that the exhaust gas temperature Ty on the upstream side is lower than the low temperature Tb in the above-described steps (S220: YES), the timer 38 counts a time tx that has passed since the exhaust gas temperature Ty on the upstream side became lower than the low temperature Tb (S230). Next, the warming determination unit 34 determines whether the counted time tx has passed a predetermined determination time ta (S240).

The determination time ta is set to a time at which it is possible to determine that state in which the particulate matter adhering to the inlet side end face of the oxidation catalyst device 22 is difficult to burn or the state in which the unburned fuel F1 injected from the pipe injection valve 21 is difficult to vaporize is continued. In other words, the determination time ta is set to a time at which it is possible to determine a state in which clogging may occur on the inlet side end surface of the oxidation catalyst device 22 due to continued low-speed low-load operation of the engine 10.

In a case where it is determined that the counted time tx has not passed the determination time ta in the above-described steps (S240: NO), since an upstream end face of the oxidation catalyst device 22 is not in a state likely to be clogged or has been clogged, the process returns to the start. On the other hand, in a case where it is determined that the counted time tx has passed the determination time ta in the above-described steps (S240: YES), since the upstream end face of the oxidation catalyst device 22 is likely to be clogged or has been clogged, the warming determination unit 34 determines to perform the warming control (sets a flag) (S250), and the process returns to the start.

In a case where it is determined that the exhaust gas temperature Ty on the upstream side is higher than the low temperature Tb in the above-described steps (S220: NO), the timer 38 counts a time ty that has passed since the exhaust gas temperature Ty on the upstream side reached the low temperature Tb (S260). Next, the warming determination unit 34 determines whether the counted time ty has passed a predetermined release time tb (S270).

The release time tb is set to a time at which it is possible to determine that state in which the particulate matter adhering to the inlet side end face of the oxidation catalyst device 22 is difficult to burn or the state in which the unburned fuel F1 injected from the pipe injection valve 21 is difficult to vaporize is released. In other words, the release time tb is set to a time at which it is possible to determine that the low-speed low-load operation of the engine 10 has been released.

In a case where it is determined that the counted time ty has not passed the release time tb in the above-described steps (S270: NO), the process returns to the start. On the other hand, in a case where it is determined that the counted time ty has passed the release time tb in the above-described steps (S270: YES), the warming determination unit 34 determines not to perform the warming control (unsets a flag) (S280), and the process returns to the start.

Figure 5:
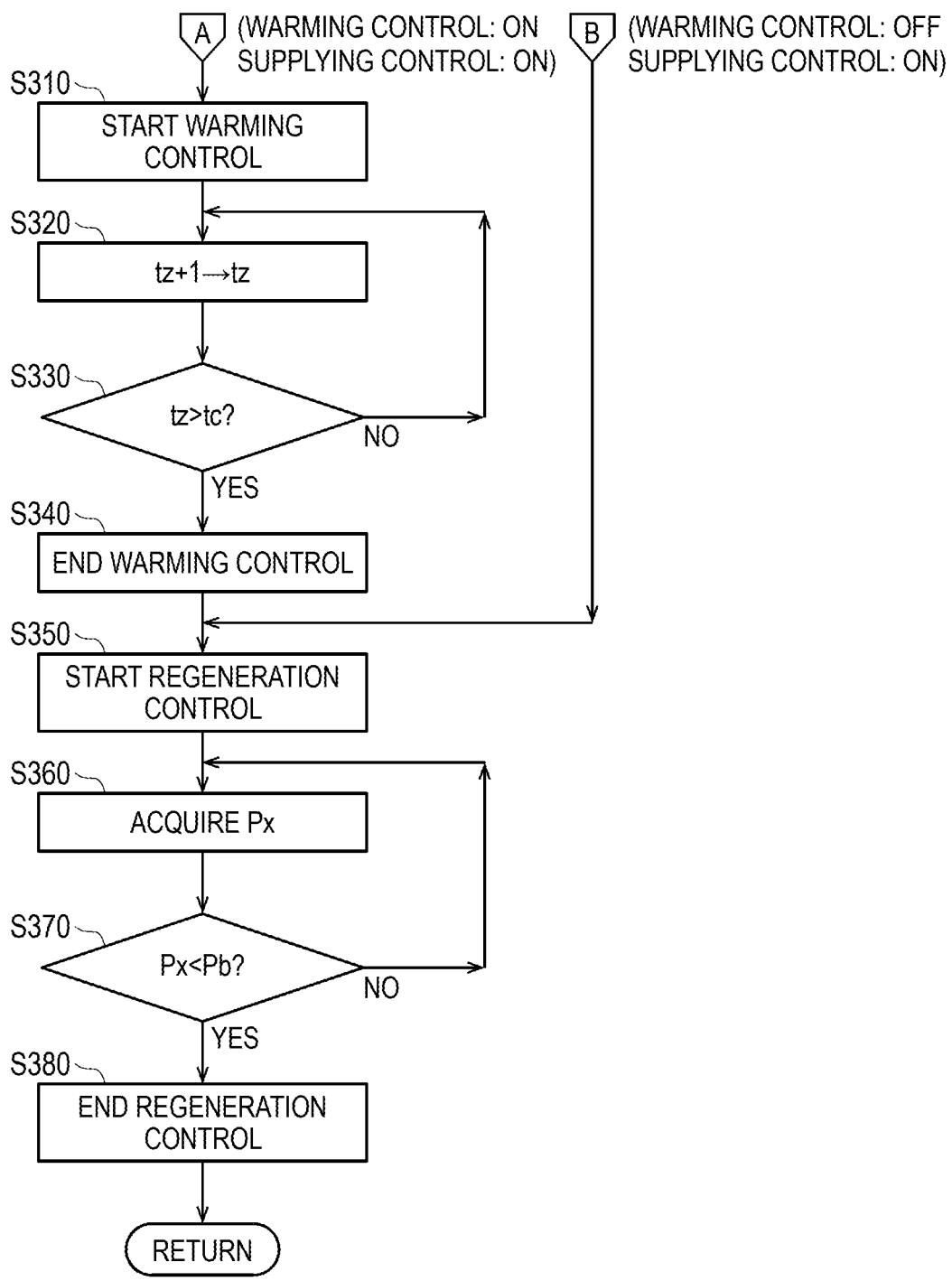
FIG. 5 is a third flowchart illustrating the first embodiment of the method for controlling an engine according to this disclosure.

As illustrated in FIG. 5, in a case where it is determined to perform the supplying control and to perform the warming control according to the flow illustrated in FIGS. 3 and 4, the process starts from A. On the other hand, in a case where it is determined to perform the supplying control without performing perform the warming control, the process starts from B.

The warming adjustment unit 35 starts the warming control (S310). The warming adjustment unit 35 adjusts the injection timing and the injection amount of the fuel injected from the cylinder injection valve 12 so as to raise higher than the low temperature Tb the temperature of the exhaust gas G1 substantially free of the unburned fuel discharged from the exhaust valve 13, thereby warming the oxidation catalyst device 22.

Figure 6:
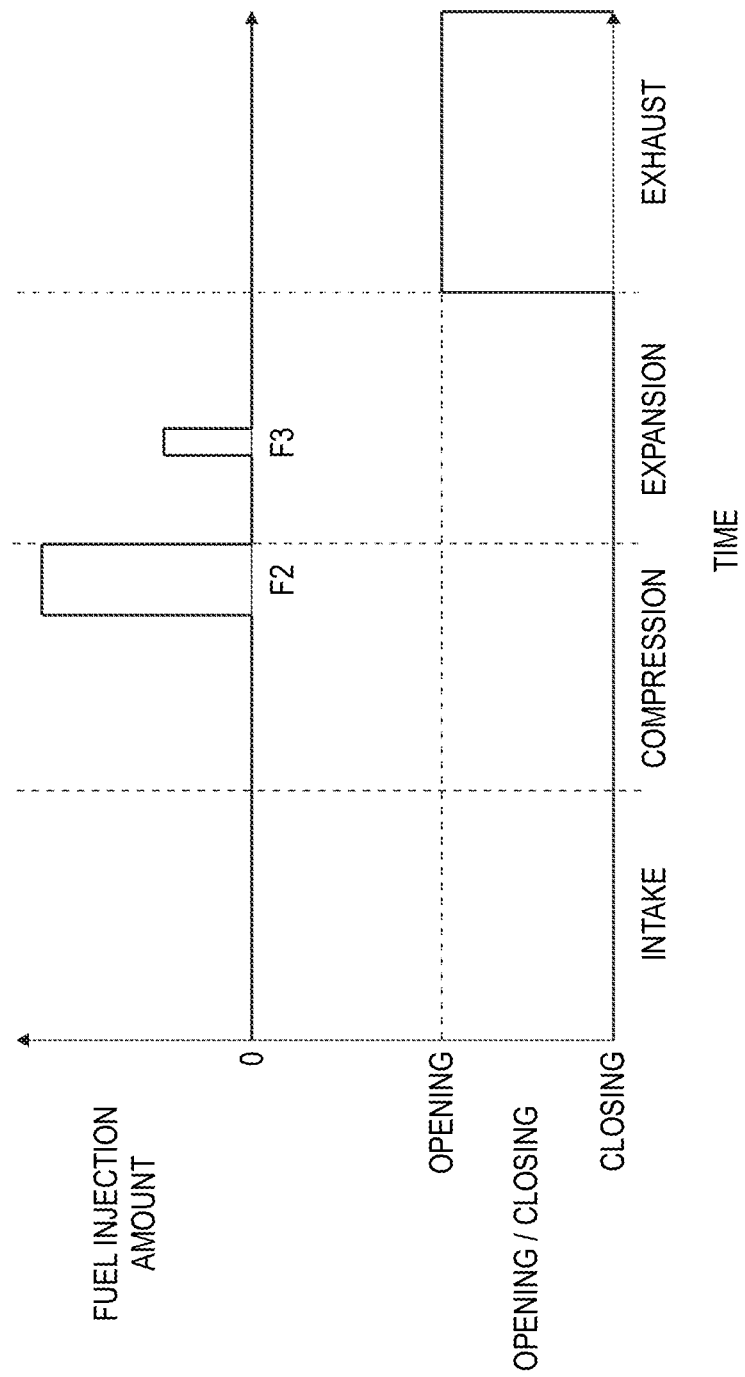
FIG. 6 is an explanatory diagram illustrating warming control of the engine of FIG. 1.

As illustrated in FIG. 6, the warming adjustment unit 35 causes the cylinder injection valve 12 to perform multi-injection based on the exhaust gas temperature Ty after passing through the oxidation catalyst device 22 acquired by the post-passage temperature acquisition device 32, so as to adjust the exhaust gas temperature Ty equal to or higher than a predetermined clogging-preventing temperature Tc.

The multi-injection is injection of discharging the exhaust gas G1 substantially free of the unburned fuel from the exhaust valve 13 and raising the post-pass exhaust gas temperature Ty to the clogging-preventing temperature Tc which is higher than the low temperature Tb. Specifically, the multi-injection is injection of performing an after-injection F3 after a main injection F2 of a compression stroke in the cylinder 11. By burning an unburned residue of the main injection F2 in the cylinder 11 via the after-injection F3, the exhaust gas G1 substantially free of the unburned fuel is discharged from the exhaust valve 13, and the exhaust gas temperature Tx on the upstream side is raised due to the combustion.

Although the multi-injection in which the injection timing of the cylinder injection valve 12 is adjusted is used in this embodiment, the timing of opening the exhaust valve 13 in accordance with the multi-injection may be adjusted to be earlier than the exhaust stroke. The timing of performing the main injection F2 may be retarded instead of the after-injection F3.

The clogging-preventing temperature Tc is set to a temperature higher than the low temperature Tb and lower than the forced regeneration temperature Ta. Specifically, the clogging-preventing temperature Tc is preferably a temperature at which a high-adhesiveness particulate matter adhering to the inlet side end face of the oxidation catalyst device 22 can be brought into a dry state, and is more preferably a temperature at which the particulate matter can be combustion-removed.

Next, the timer 38 counts a time tz that has passed since the warming control was started (S320). Next, the warming adjustment unit 35 determines whether the counted time tz has passed a predetermined warming period tc (S330).

The warming period tc is a period for maintaining the post-pass exhaust gas temperature Ty at the clogging-preventing temperature Tc, and is set to a period necessary for bringing into a dry state, or combustion-removing, the high-adhesiveness particulate matter adhering to the inlet side end face of the oxidation catalyst device 22.

In a case where it is determined that the counted time tz has not passed the warming period tc in the above-described steps (S330: NO), the warming control is continued, and the time tz is counted again. On the other hand, in a case where it is determined that the counted time tz has passed the warming period tc (S330: NO), the warming adjustment unit 35 ends the warming control (S340).

Next, the supply adjustment unit 37 starts the supplying control (S350). As described above, the supplying control injects the unburned fuel F1 from the pipe injection valve 21, so as to oxidize the unburned fuel F1 in the oxidation catalyst device 22. By using the oxidation reaction heat generated by the oxidation, the exhaust gas temperature Tx after passing through the oxidation catalyst device 22 is raised to the forced regeneration temperature Ta, so as to combustion-remove the particulate matter collected by the collection filter 23 due to oxidation.

Next, the collection-status acquisition device 33 acquires the differential pressure Px before and after the collection filter 23 (S360). Next, based on the differential pressure Px, the supply determination unit 36 determines whether the differential pressure Px is lower than a predetermined regeneration end differential pressure Pb (S370).

The regeneration end differential pressure Pb is set to a value at which it is possible to determine that the particulate matter collected by the collection filter 23 has been combustion-removed.

In a case where it is determined that the differential pressure Px is equal to or higher than the regeneration end differential pressure Pb in the above-described steps (S370: NO), the supplying control is continued, and the differential pressure Px is acquired again. On the other hand, in a case where it is determined that the differential pressure Px is lower than the regeneration end differential pressure Pb (S370: YES), the supply determination unit 36 ends the supplying control (S380), and the process returns to the start. In a case where the supplying control is ended, all of the timer 38 and the control flags are reset.

Figure 7:
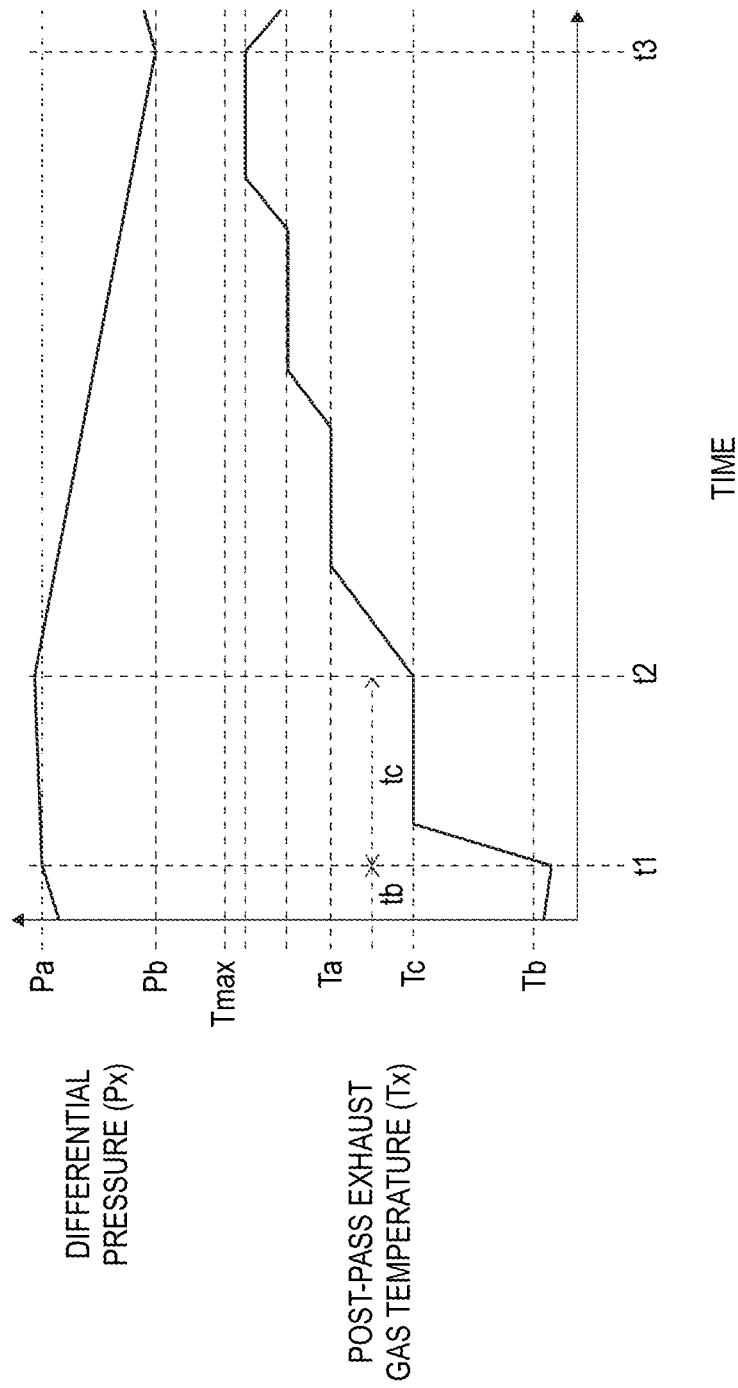
FIG. 7 is a chronological diagram illustrating a differential pressure before and after the collection filter and a change in an exhaust gas temperature after passing through an oxidation catalyst device of the engine of FIG. 1.

As illustrated in FIG. 7, the time tx that has passed until a time t1 since the exhaust gas temperature Ty on the upstream side became lower than the predetermined low temperature Tb (S220: YES) exceeds a predetermined determination time ta (S240: YES), and it is determined to perform the warming control (S250). When the time t1 is reached, the post-pass exhaust gas temperature Tx is lower than the forced regeneration temperature Ta, the differential pressure Px exceeds the regeneration start differential pressure Pa (S120: YES), and it is determined to perform the supplying control (S130).

During the period from the time t1 to a time t2, the control of warming the oxidation catalyst device 22 is performed (S310 to S340). At this time, the exhaust gas temperature Tx after passing through the oxidation catalyst device 22 is maintained at the clogging-preventing temperature Tc. The warming control is performed until the certain warming period tc has passed. In this embodiment, the time tz is counted since the warming control was started, but may also be counted since the post-pass exhaust gas temperature Tx became the clogging-preventing temperature Tc.

The supplying control is performed from the time t2 at which the warming period tc has passed (S360 to S380). The supplying control is performed until a time t3 at which the differential pressure Px becomes lower than the regeneration end differential pressure Pb.

As described above, according to the engine 10, in a status where the exhaust gas temperature Ty on the upstream side of the oxidation catalyst device 22 is low and the inlet side end surface of the oxidation catalyst device 22 is clogged, the warming control of warming the oxidation catalyst device 22 to the clogging-preventing temperature Tc is performed before performing the supplying control until the warming period tc has passed.

By warming the oxidation catalyst device 22 before the supplying control in this manner, it is possible to dry or combustion-remove the soluble organic fraction or soot adhering to the inlet side end face of the oxidation catalyst device 22 before supplying the unburned fuel F1 to the oxidation catalyst device 22. As a result, even if the unburned fuel F1 is supplied to the oxidation catalyst device 22 due to the supplying control, it is advantageous for preventing adherence of the soluble organic fraction and the soot to the inlet side end surface of the oxidation catalyst device 22, and it is possible to prevent clogging of the inlet side end surface of the oxidation catalyst device 22.

The engine 10 described above limits the warming control in a state in which clogging may occur on the inlet side end surface of the oxidation catalyst device 22 due to continued low-speed low-load operation of the engine 10, and thus is capable of preventing deterioration of the fuel consumption that increases due to the multi-injection in the warming control.

The engine 10 described above sets the clogging-preventing temperature Tc in the warming control to a temperature higher than the low temperature Tb and lower than the forced regeneration temperature Ta. In order to maintain the exhaust gas temperature Ty after passing through the oxidation catalyst device 22 in this temperature range in the warming control, fuel less than the unburned fuel F1 injected from the pipe injection valve 21 in the supplying control may be injected. Therefore, it is advantageous for bringing the high-adhesiveness particulate matter adhering to the inlet side end face of the oxidation catalyst device 22 into a dry state, or combustion-removing the particulate matter, while preventing deterioration of the fuel consumption.

In the related art, in a case of forcibly regenerating the collection filter 23, the post-pass exhaust gas temperature Ty rises and the oxidation catalyst device 22 primarily reaches the clogging-preventing temperature Tc, but the supply of the unburned fuel F1 is started before the state of clogging of the upstream end surface of the oxidation catalyst device 22 changes. On the other hand, in the warming control, the engine 10 warms the oxidation catalyst device 22 until the warming period tc has passed. That is, by warming the oxidation catalyst device 22 until the state of clogging of the upstream end surface of the oxidation catalyst device 22 is improved, it is advantageous for avoiding a problem such that even if the unburned fuel F1 is newly supplied, the unburned fuel F1 is accumulated as a factor of the particulate matter.

The engine 10 described above performs the warming control before the supplying control of forcibly regenerating the collection filter 23. Therefore, it is advantageous for preventing new particulate matter from accumulating on the particulate matter accumulated on the upstream end surface of the oxidation catalyst device 22 due to the low-speed low-load operation of the engine 10 between a previous forced regeneration and a current forced regeneration.

Figure 8:
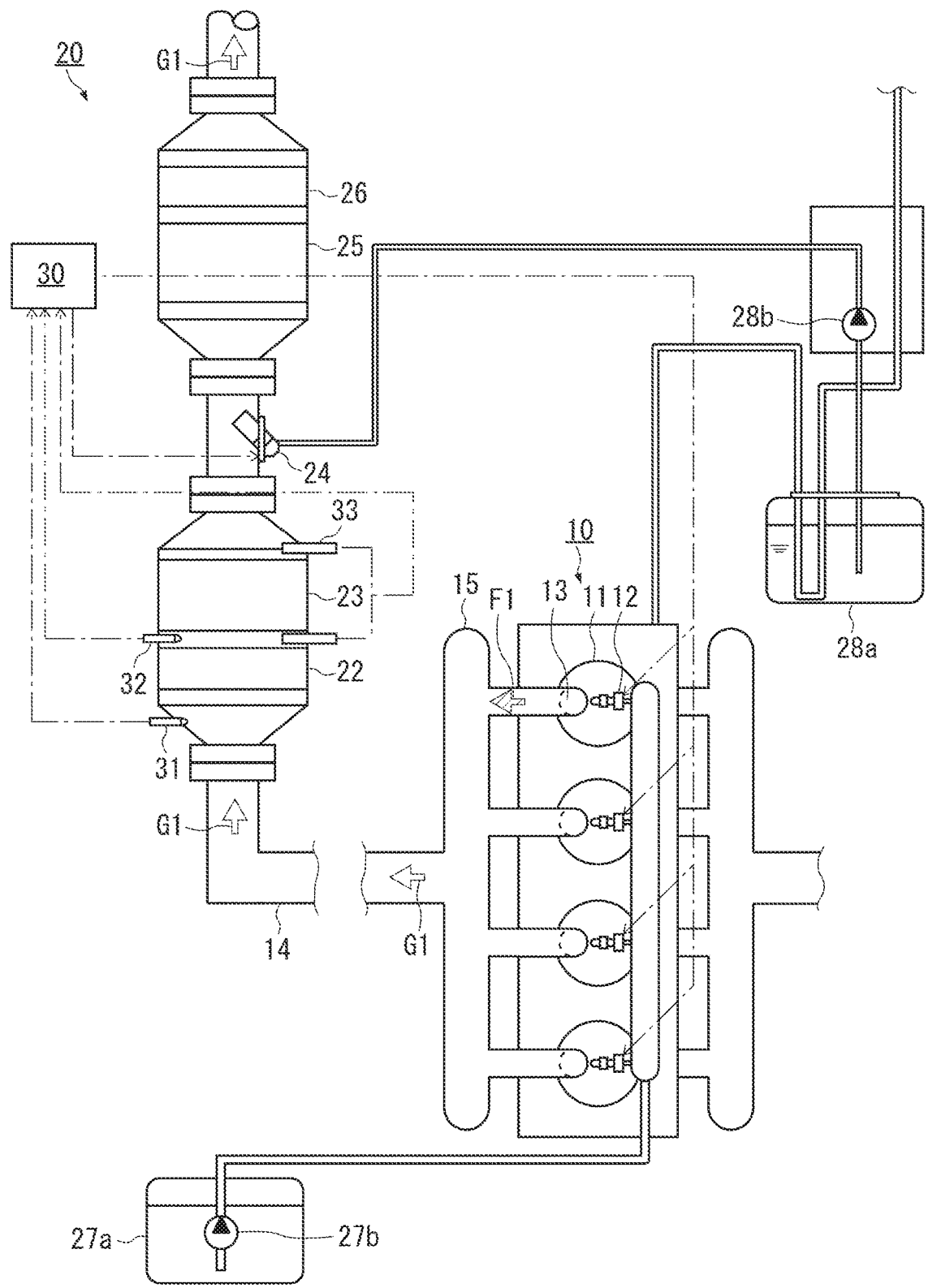
FIG. 8 is a block diagram illustrating a second embodiment of the engine according to this disclosure.
Figure 9:
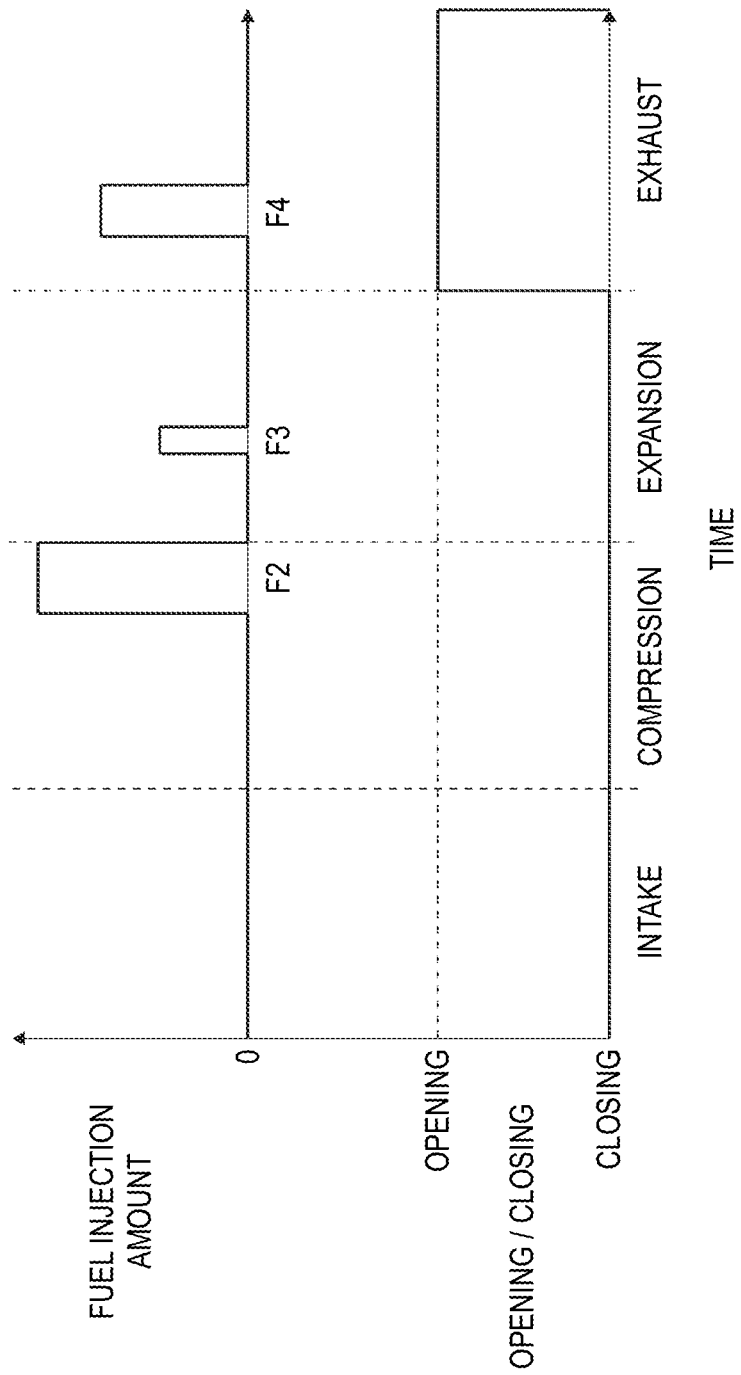
FIG. 9 is an explanatory diagram illustrating supplying control of the engine of FIG. 8.

As illustrated in FIGS. 8 and 9, an engine 10 of a second embodiment is different from the first embodiment in that a post injection F4 of the cylinder injection valve 12 is used instead of the pipe injection valve 21.

The post injection F4 injects fuel from the cylinder injection valve 12 at a timing of opening the exhaust valve 13, and discharges the exhaust gas G1 containing the unburned fuel from the exhaust valve 13. Specifically, the post injection F4 is performed at a timing of opening the exhaust valve 13 in the exhaust stroke.

As described above, the supplying control only needs to supply the unburned fuel F1 for forcibly regenerating the collection filter 23 to the oxidation catalyst device 22, and is exemplified as the control using the pipe injection valve 21 of the first embodiment and the control using the cylinder injection valve 12 of the second embodiment.

Figure 10:
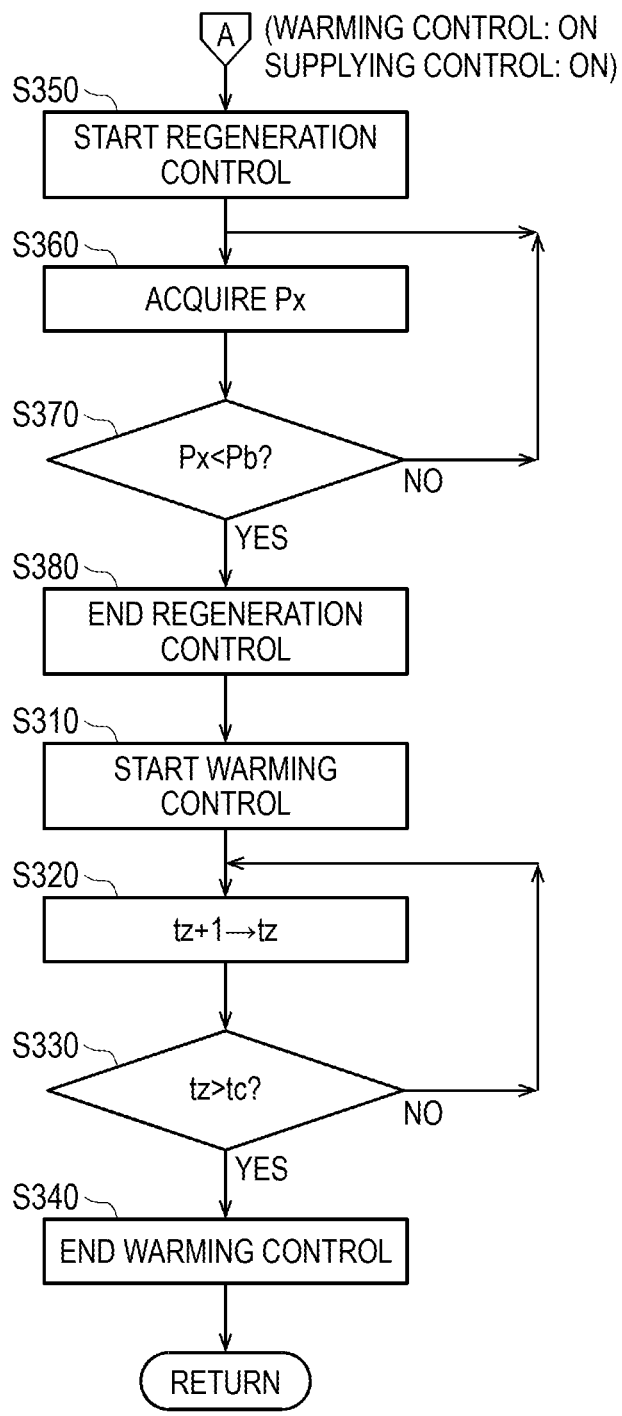
FIG. 10 is a flowchart illustrating a second embodiment of the method for controlling an engine according to this disclosure.

As illustrated in FIGS. 10 and 11, the engine 10 of a second embodiment is different from the first embodiment in that the warming control is performed immediately after the supplying control.

The time tx that has passed since the exhaust gas temperature Ty on the upstream side became lower than the predetermined low temperature Tb (S220: YES) exceeds a predetermined determination time ta (S240: YES), and it is determined to perform the warming control (S250). The supplying control is performed until the time t3 (S360 to S380), and is completed at the time t3. At the time t3, the control of warming the oxidation catalyst device 22 is performed (S310 to S340). At this time, the exhaust gas temperature Tx after passing through the oxidation catalyst device 22 is maintained at the clogging-preventing temperature Tc. The warming control is performed until the certain warming period tc has passed. In this embodiment, the time tz is counted since the warming control was started, but may also be counted since the post-pass exhaust gas temperature Tx became the clogging-preventing temperature Tc.

In this way, the engine 10 of the second embodiment performs the warming control after the supplying control of forcibly regenerating the collection filter 23. Therefore, it is advantageous for reducing the residual amount of the unburned fuel F1 supplied to the oxidation catalyst device 22 due to the forced regeneration, and it is possible to avoid the unburned fuel F1 from accumulating due to non-oxidation and to prevent clogging of the upstream end surface of the oxidation catalyst device 22.

In the above-described embodiments, the control of warming the oxidation catalyst device 22 is performed immediately before or after the supplying control of forcibly regenerating the collection filter 23, but may also be periodically performed during the low-speed low-load operation of the engine 10 (S220: YES, S240: YES). However, since periodically performing the control may cause deterioration of the fuel efficiency, by performing the heating control immediately before or after the supplying control of forcibly regenerating the collection filter 23 as in these embodiments, it is advantageous for preventing clogging of the upstream end surface of the oxidation catalyst device 22 while preventing the deterioration of the fuel efficiency. Further, by performing the warming control immediately after the supplying control of forcibly regenerating the collection filter 23, it is advantageous for reliably avoiding the non-oxidation of the unburned fuel F1. It is to be noted that immediately before or after in the present specification is inclusive of a state in which a short time, for example, a gap of ten minutes, exists between the warming control and the supplying control.

In the above-described embodiments, the control of warming the oxidation catalyst device 22 is performed either immediately before or immediately after the supplying control of forcibly regenerating the collection filter 23, but may also be performed both before and after the supplying control.

The present application is based on Japanese Patent Application No. 2017-099817 filed on May 19, 2017, contents of which are incorporated herein as reference.

INDUSTRIAL APPLICABILITY

This disclosure is advantageous for preventing adherence of a soluble organic fraction and a soot to an inlet side end surface of an oxidation catalyst device, and is capable of reducing clogging of the inlet side end surface of the oxidation catalyst device.

REFERENCE SIGNS LIST

10 Engine
11 Cylinder
12 Cylinder injection valve
13 Exhaust valve
14 Exhaust passage
20 Exhaust gas purification system
22 Oxidation catalyst device
23 Collection filter
30 Control device
31 Upstream temperature acquisition device
G1 Exhaust gas
F1 Unburned fuel
Ty Exhaust gas temperature on upstream side
Tb Low temperature
tc Warming period

The invention claimed is:

1. An engine that includes, a cylinder, a cylinder injection valve that injects a fuel into the cylinder, an exhaust valve that discharges an exhaust gas generated due to combustion of the injected fuel from the cylinder, an exhaust passage through which the discharged exhaust gas passes and an exhaust gas purification system disposed in the exhaust passage, wherein the exhaust gas purification system includes, in order from an upstream side toward a downstream side with respect to a flow of the exhaust gas in the exhaust passage, an oxidation catalyst device that oxidizes a fuel and a nitrogen oxide contained in the exhaust gas and a collection filter that collects a particulate matter contained in the exhaust gas, the engine comprising:
an upstream temperature acquisition device that acquires an exhaust gas temperature on the upstream side of the oxidation catalyst device; and
a control device, wherein based on the exhaust gas temperature on the upstream side acquired by the upstream temperature acquisition device, in performing control of supplying an unburned fuel to the oxidation catalyst device in a case where the exhaust gas temperature on the upstream side is lower than a predetermined low temperature, the control device performs control of: adjusting at least one of an injection timing of the cylinder injection valve and an opening-closing timing of the exhaust valve in at least one of before and after the supplying control; raising a temperature of the exhaust gas that substantially free of unburned fuel discharged from the exhaust valve to be higher than the low temperature; and warming the oxidation catalyst device until a predetermined warming period has passed.

2. The engine according to claim 1, comprising:
a post-pass temperature acquisition device that is connected to the control device and acquires a post-pass exhaust gas temperature of the oxidation catalyst device,
wherein in the warming control, based on the post-pass exhaust gas temperature acquired by the post-pass temperature acquisition device, the control device performs control of setting the post-pass exhaust gas temperature to a clogging-preventing temperature higher than the low temperature and lower than the post-pass exhaust gas temperature in the supplying control.

3. The engine according to claim 1,
wherein the warming control is performed before the supplying control.

4. The engine according to claim 1,
wherein the warming control is performed after the supplying control.

5. The engine according to claim 1, comprising:
a collection-status acquisition device that acquires a collection status of the collection filter,
wherein in the supplying control, based on the collection status acquired by the collection-status acquisition device, the control device performs control of: adjusting at least one of the injection timing of the cylinder injection valve and the opening-closing timing of the exhaust valve; supplying the unburned fuel discharged from the exhaust valve to the oxidation catalyst device; raising the exhaust gas temperature passing through the collection filter due to oxidation of the unburned fuel in the oxidation catalyst device; and thereby removing a collected matter collected by the collection filter.

6. The engine according to claim 1, comprising:
a pipe injection valve that is disposed in the exhaust passage and injects a fuel; and
a collection-status acquisition device that acquires a collection status of the collection filter,
wherein the pipe injection valve and the collection-status acquisition device are connected to the control device, and
wherein in the supplying control, based on the collection status acquired by the collection-status acquisition device, the control device performs control of: adjusting an injection timing of the pipe injection valve; supplying an unburned fuel injected from the pipe injection valve to the oxidation catalyst device; raising the exhaust gas temperature passing through the collection filter due to oxidation of the unburned fuel in the oxidation catalyst device; and
thereby removing a collected matter collected by the collection filter.

7. A method for controlling an engine to regenerate a collection filter by: adjusting at least one of an injection timing of a cylinder injection valve that injects a fuel into a cylinder and opening-closing timing of an exhaust valve that discharges an exhaust gas generated due to combustion of an injected fuel from the cylinder or adjusting an injection timing of a pipe injection valve disposed in an exhaust passage through which a discharged exhaust gas passes and injects a fuel; supplying unburned fuel to an oxidation catalyst device disposed in the exhaust passage; raising an exhaust gas temperature due to oxidation of the provided unburned fuel, and thereby removing a collected matter collected by a collection filter disposed on a downstream side of the oxidation catalyst device, comprising:
acquiring an exhaust gas temperature on the upstream side of the oxidation catalyst device;
determining whether the exhaust gas temperature on the upstream side acquired by the upstream temperature acquisition device is equal to or lower than a predetermined low temperature;
wherein in supplying the unburned fuel to the oxidation catalyst device to regenerate the collection filter in a case where it is determined that the exhaust gas temperature on the upstream side is equal to or lower than the low temperature, the method comprising:
discharging an exhaust gas at a temperature higher than the low temperature in a manner substantially free of the unburned fuel by adjusting the at least one of the injection timing of the cylinder injection valve and the opening-closing timing of the exhaust valve at least one of before and after regenerating the collection filter; and
warming the oxidation catalyst device with the discharged exhaust gas until a warming period has passed.

* * * * *